July 26, 1927.
R. TICHOTA
1,636,879
ANTIFROST VISION APPLIANCE
Filed March 6, 1926
Fig. 1.
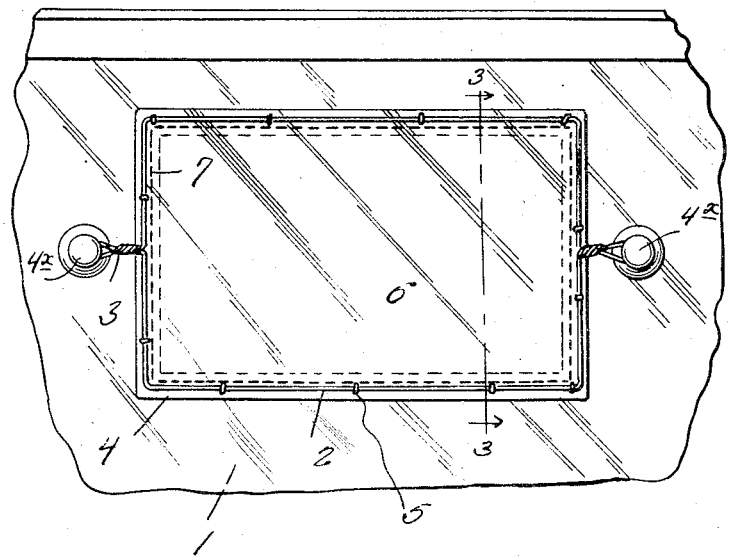
Fig. 2.
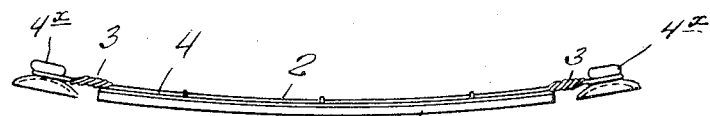
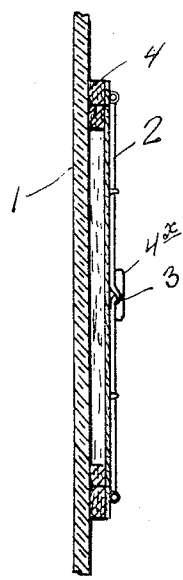
Fig. 3.
Inventor
R. Tichota,
By Clarence A. O'Brien
Attorney Patented July 26, 1927.

1,636,879

UNITED STATES PATENT OFFICE.

RUDOLPH TICHOTA, OF DODGE, NEBRASKA.

ANTIFROST VISION APPLIANCE.

Application filed March 6, 1926. Serial No. 92,889.

Incident to the driving of a closed automobile on a cold day with all of the windows closed, it frequently happens that the front glass or windshield becomes frosted and seriously interferes with the vision of the driver.

The general object of my said invention is the provision of a peculiar and advantageous anti-frost vision device calculated to prevent frosting of the portion of the front glass or windshield in front of the driver of an automobile, so that by glancing through the transparent portion of the device a driver is enabled to adequately see in front and at either side of the path of an automobile, notwithstanding the remainder of the front glass or windshield may be materially frosted.

Other objects and practical advantages of the invention will be fully understood from the following description and claim when the same are read in connection with the drawings, accompanying and forming part of this specification, in which:—

Figure 1 is a rear elevation illustrating the appliance constituting the best practical embodiment of my invention of which I am cognizant as properly positioned on the inner rear side of the front glass or windshield of an automobile of closed type.

Figure 2 is a top plan view illustrating the preferred embodiment of my invention in its normal state—i. e., as it appears precedent to being applied to a front glass or windshield.

Figure 3 is a fragmentary section taken in the plane indicated by the line 3—3 of Figure 1, looking toward the right.

Similar numerals of reference designate corresponding parts in all of the views of the drawings.

I show in Figures 1 and 3, the usual front glass or windshield 1, of a closed automobile, that is to say, an automobile of the sedan or limousine type.

The preferred embodiment of my invention is designed to be applied flatwise against the inner or rear side of the glass 1, and in front of the driver of the automobile. As illustrated, my novel device comprises a frame 2, preferably, though not necessarily, of rectangular form and composed of resilient wire or other material possessed of resiliency of the particular purpose hereinafter set forth. At opposite points the said frame 2 is provided with loops 3 through the medium of which the frame 2 is attached to suction cups 4ˣ of insulated rubber or rubber composition or other equivalent material.

In addition to the frame 2 and its appurtenances as set forth, my appliance includes an open packing frame 4 of felt or other appropriate material, adapted for interposition between the frame 2 and the glass 1, and attached at 5 to the frame 2 so as to form a permanent part of the appliance, and the appliance also comprises a flexible transparent member 6, preferably of isinglass.

The transparent member or pane 6 is attached by stitches 7 or other appropriate means to the packing frame 4 and is preferably arranged between the said packing frame 4 and the frame 2, the latter frame being by preference of metal.

Normally my novel appliance is concavo-convex in the direction of its length, this feature being advantageous inasmuch as it contributes to the insulation within the packing frame 4 when the device is flattened against the glass 1 and the suction cups 4ˣ are caused to adhere to the glass 1 when the device is positioned for use on the glass 1.

The normal concavo-convex state of the frame 2 and the resilient character of the said frame 2 is advantageous because by virtue of the spring frame 2 tending to resume its normal concavo-convex state, even pressure of the packing frame 4 against a pane of glass throughout the length of said packing frame 4 is assured.

At this point I would have it distinctly understood that it is within the purview of my invention for the transparent member 6 to be clear white or to be of amber or other appropriate tint, a tinted transparent member or pane 6 being advantageous in many instances inasmuch as in addition to the antifrosting feature, the said member or pane 6 may be depended upon to adequately protect the eyes of the driver against glare.

Manifestly when my novel device is applied to the glass 1 in the manner described, air is effectively excluded from the space within the packing frame 4 and opposite the transparent member or pane 6, and consequently no matter how much the remainder of the glass 1 may be obscured by the collection of frost thereon, the portion of the glass 1 opposite the pane or member 6 will be maintained in a perfectly clear state, so that by sighting through the member or pane 6 the driver of the automobile can without difficulty see the road in front of the automobile and points at opposite sides of the road.

It will be apparent from the foregoing that the preferred embodiment of my invention is readily applicable to and detachable from the front glass of a closed automobile without the employment of skilled labor or tools of any description, and from this it follows that in the summer time when it is not desired to use the device as an anti-glare device, the device may be removed and may be stored for subsequent use in the winter season.

It will also be appreciated that my novel device is simple and inexpensive in construction and neat in appearance, and that by virtue of the latter the device when applied as described is calculated to enhance rather than detract from the finished appearance of the usual automobile of closed type.

I have entered into a detailed description of the appliance constituting the preferred embodiment of my invention in order to impart a full, clear and exact understanding of the said embodiment. I do not desire, however, to be understood as limiting myself to the precise construction disclosed, my invention being defined by my appended claim within the scope of which modifications in structure and in arrangement and form may be made without departure from my invention.

Having described my invention, what I claim and desire to secure by Letters Patent, is:—

An anti-frost vision device comprising a resilient, normally concavo-convex open frame, suction cups disposed at opposite sides of and connected with the ends of said open frame, a second open frame of flexible packing material opposed to the first named open frame, and connected therewith; said packing frame being of greater width than the first named open frame, and a flexible transparent member or pane interposed between the first named open frame and the frame of flexible packing material and connected to said frame of packing material, the said first named open frame, the packing frame and the transparent member or pane being adapted to flex as a unit.

In testimony whereof I affix my signature.

RUDOLPH TICHOTA.